United States Patent [19]

Nakamura et al.

[11] 4,268,853
[45] May 19, 1981

[54] SYNCHRONIZING SIGNAL GENERATOR FOR A PAL TELEVISION SIGNAL PROCESSING SYSTEM

[75] Inventors: Takashi Nakamura, Hatano; Akira Taki, Atsugi, both of Japan

[73] Assignee: Sony Corporation, Tokyo, Japan

[21] Appl. No.: 105,305

[22] Filed: Dec. 19, 1979

[30] Foreign Application Priority Data

Dec. 22, 1978 [JP] Japan ................. 53-163810

[51] Int. Cl.³ ............................................. H04N 9/44
[52] U.S. Cl. ......................................... 358/17; 358/18
[58] Field of Search ................. 358/17, 18, 19, 20, 358/21 R, 148, 150, 160

[56] References Cited

U.S. PATENT DOCUMENTS 4,024,572  5/1977  Derenbecher .................... 350/18
4,162,508  7/1979  Tatami ............................. 358/18

Primary Examiner—Marc E. Bookbinder
Assistant Examiner—Michael A. Masinick
Attorney, Agent, or Firm—Lewis H. Eslinger; Alvin Sinderbrand

[57] ABSTRACT

A synchronizing signal generator for a PAL television signal processing system includes a frequency divider which divides a reference signal from a reference oscillator to produce a color sub-carrier signal. A pulse subtracting circuit subtracts a predetermined number of pulses per line to remove an offset in the reference oscillator frequency relative to a frequency required for producing synchronizing signals. The resulting offset-removed signal is frequency divided to provide television horizontal and vertical synchronizing frequency signals. The synchronizing frequency signals are used to produce a color framing signal which can be used by external circuits to identify a particular one of each of the sequential sets of eight fields which make up a PAL television signal. The color framing signal also resets or presets the frequency divider for establishing a predetermined phase relationship between the color sub-carrier signal and the color framing signal.

13 Claims, 35 Drawing Figures

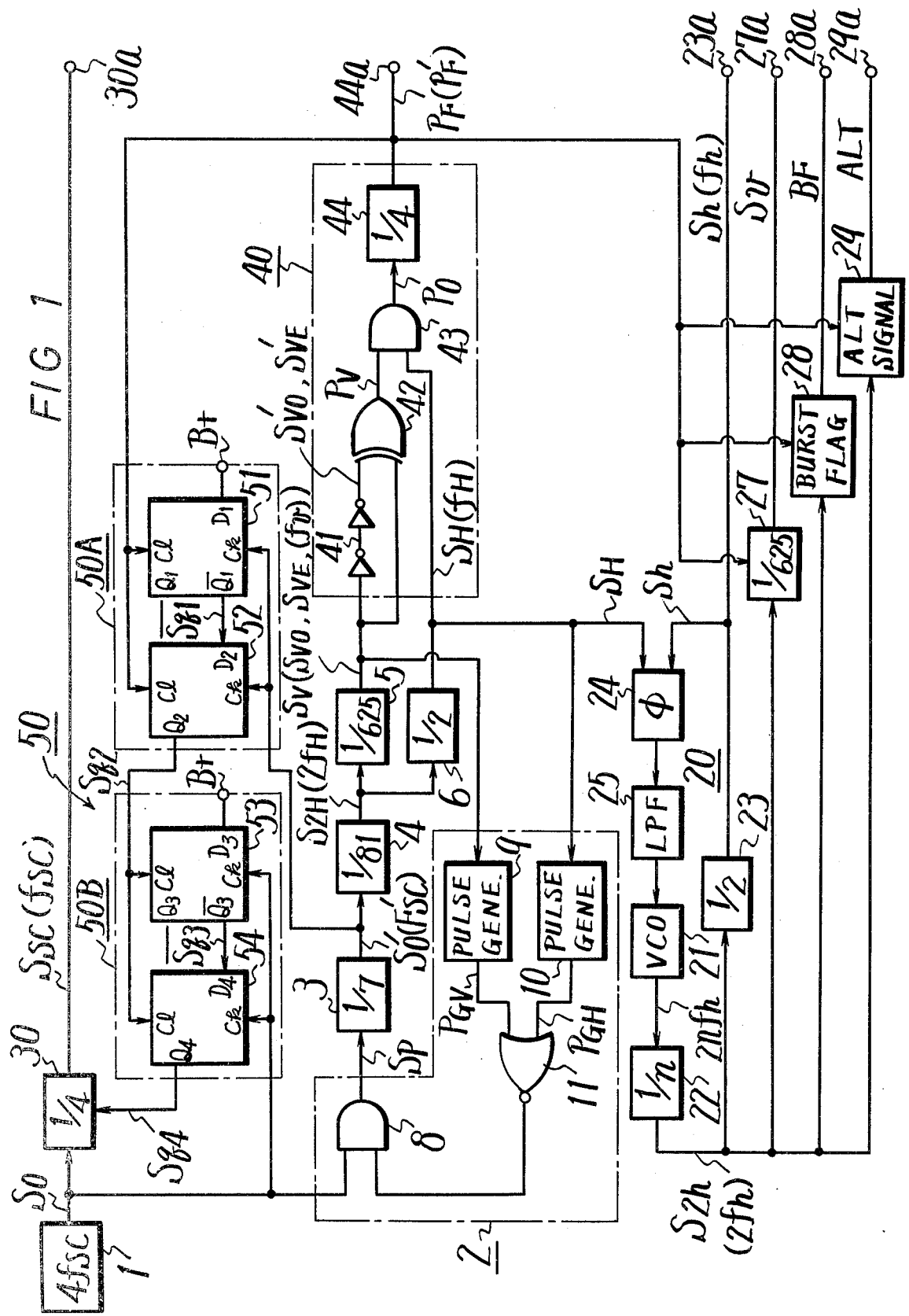

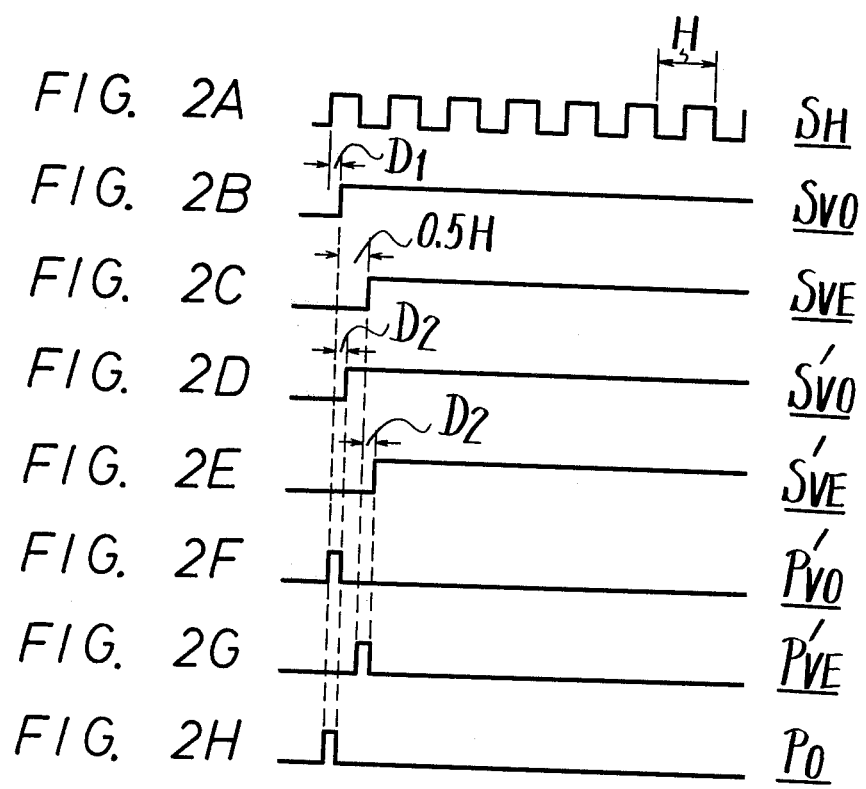
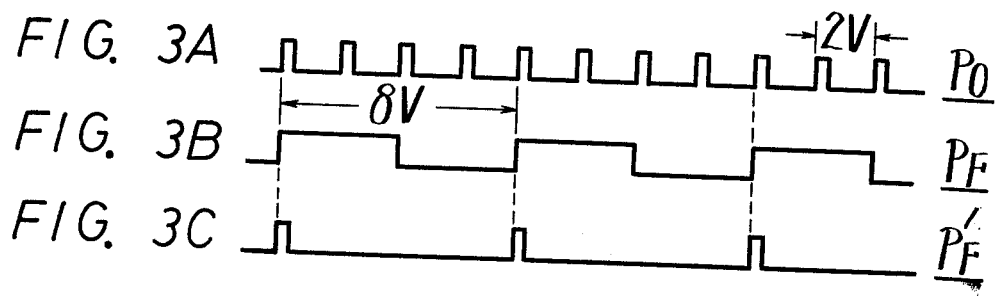

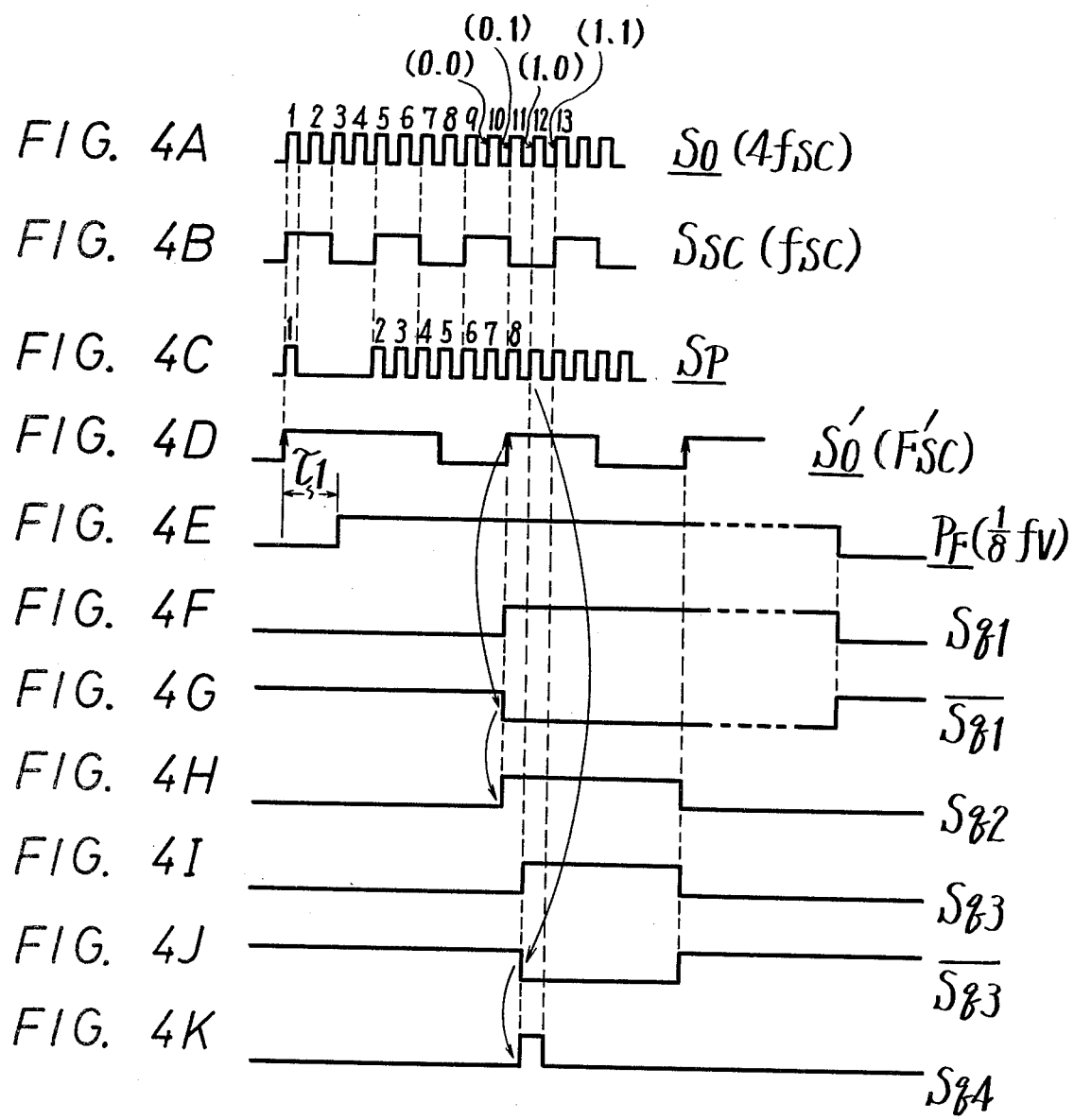
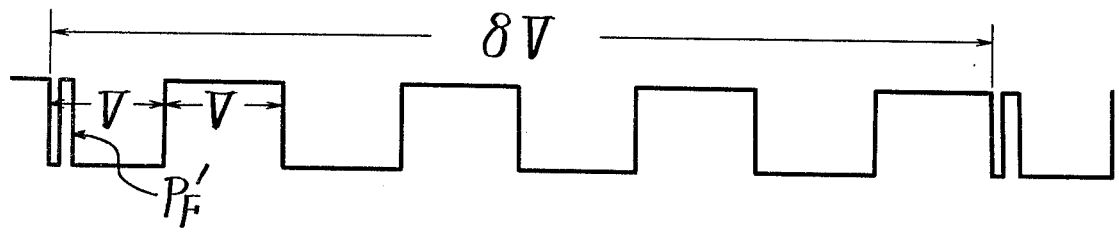

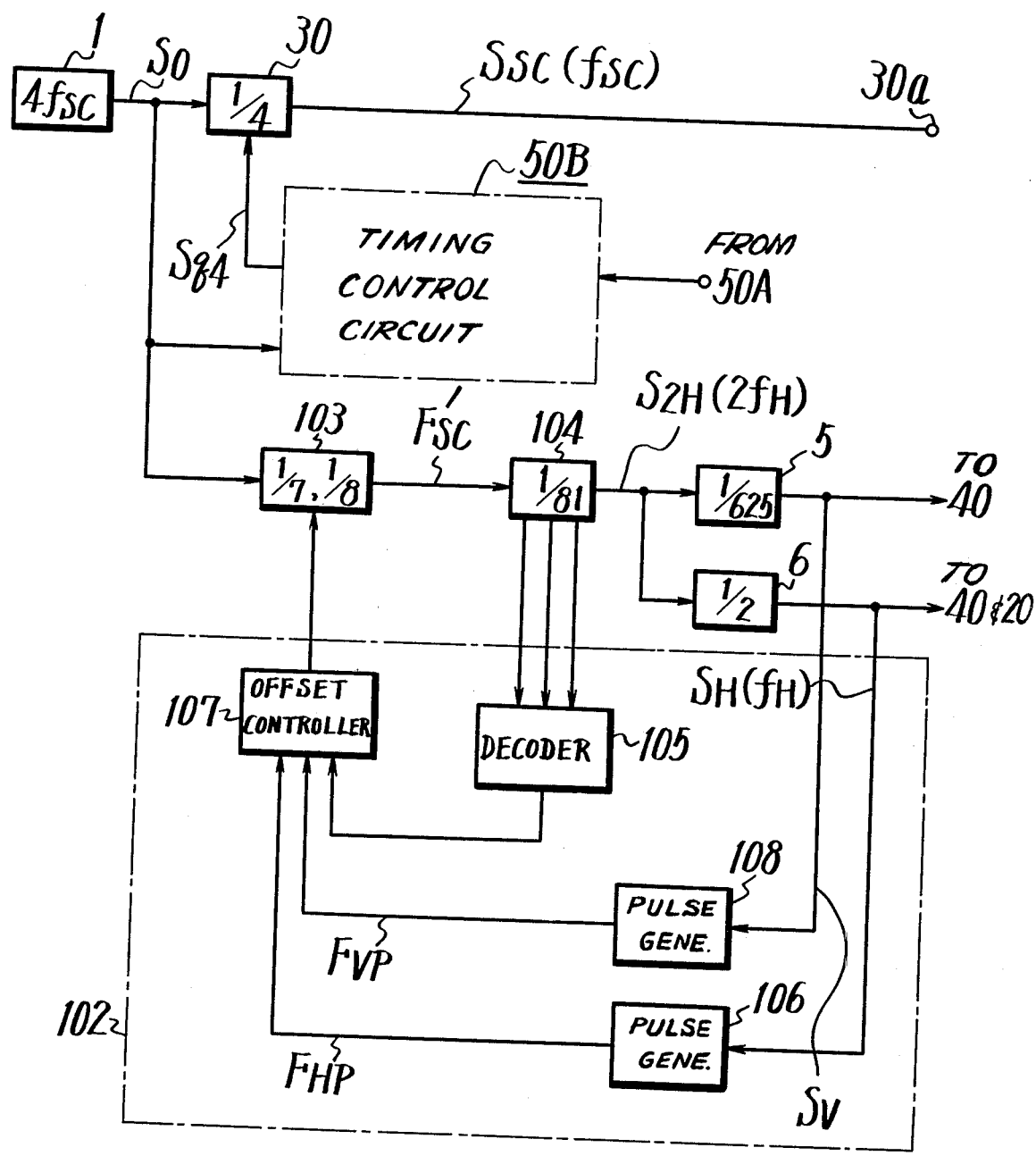

SYNCHRONIZING SIGNAL GENERATOR FOR A PAL TELEVISION SIGNAL PROCESSING SYSTEM

BACKGROUND OF THE INVENTION

The present invention generally relates to a synchronizing signal generator for a PAL television signal processing system, and is directed more particularly to a synchronizing signal generator to enable a color television camera to encode a video signal according to the PAL television system.

In the color television signal of the PAL system, the following relationships exist among the color sub-carrier frequency $f_{SC}$, the horizontal synchronizing frequency $f_H$ and the vertical synchronizing frequency $f_V$:

$$f_V = \frac{2}{625} f_H$$

$$f_{SC} = (284 - \tfrac{1}{4})f_H + \frac{1}{625} f_H, \text{ or} \quad (1)$$

$$f_{SC} = \frac{1135}{4} f_H + \tfrac{1}{2} f_V \quad (2)$$

The above relationships are established so that, when the color sub-carrier signal component is mixed with the luminance signal and dark and bright dots are produced on a television picture tube, these dots are not conspicuous to a viewer.

If a reference oscillator with an oscillation frequency the same as the frequency $f_{SC}$ of the color sub-carrier is provided and the oscillation output therefrom is frequency divided, synchronizing frequency signals having the relationship (2) cannot be produced. More particularly, it is necessary that a signal whose frequency is lower than that of the color sub-carrier frequency $f_{SC}$ by $\tfrac{1}{2}f_V(=25$ Hz) be provided and then frequency divided. Due to this non-integral relationship, such a synchronizing signal forming circuit cannot be provided by a digital circuit alone since digital frequency division is limited to division by an integer. It is theoretically possible to use a reference oscillator, whose oscillation frequency is equal to the color sub-carrier frequency $f_{SC}$ times the least common multiple of the denominators in equation (1). With such a reference oscillator frequency, both the color sub-carrier signal $f_{SC}$ and the horizontal and vertical synchronizing frequency signals can be provided by merely frequency dividing the output from the reference oscillator. However, this requires that the reference oscillator generate a frequency of about 11 GHz. Such a high frequency reference oscillator is not practical at the present time.

OBJECTS AND SUMMARY OF THE INVENTION

Accordingly, it is an object of the present invention to provide a novel synchronizing signal generator for a PAL television signal processing system.

Another object of the present invention is to provide a synchronizing signal generator, as aforesaid, which can employ digital circuits.

It is a further object of the invention to provide a novel synchronizing signal generator for a PAL television signal processing system which produces a color framing signal and contains means for synchronizing the phase of a color sub-carrier to the phase of the color framing signal.

It is a further object of the invention to provide a synchronizing signal generator for a PAL television signal processing system which provides a color framing signal and contains means for synchronizing the phase of the color sub-carrier signal and the vertical synchronizing signal to the phase of the color framing signal.

According to an aspect of this invention, a color framing signal is provided by frequency dividing the oscillation frequency $4f_{SC}$ down to $\tfrac{1}{2}f_V$, and such color framing signal is used to reset or preset a counter which counts down or frequency divides the oscillation frequency $4f_{SC}$ to produce the color sub-carrier signal $S_{SC}$. Thus, the phases of the color framing signal and the color sub-carrier signals are established in a predetermined relationship which permits maintaining color synchronization during editing.

More particularly, according to an aspect of the present invention, there is provided a synchronizing signal generator for a PAL television signal processing system of the type employing a plurality of sequentially repeating color fields, a color subcarrier signal having a frequency of $f_{SC}$, a horizontal synchronizing signal having a frequency of $f_h$ and a vertical synchronizing signal having a frequency of $f_v$: such synchronizing signal generator comprising means for providing a reference signal having a frequency of $P \cdot f_{SC}$ (where P is an integer) satisfying the equation:

$$f_{SC} = (284 - \tfrac{1}{4} f_h) + 1/625 f_h$$
$$= 1135/4 f_h + \tfrac{1}{2} f_v$$

means for dividing the reference signal by P to provide the color sub-carrier signal, means for periodically removing a predetermined number of cycles from the reference signal to produce an offset-free reference signal, means responsive to the offset-free reference signal for producing the vertical and horizontal synchronizing signals, means responsive to the offset-free reference signal for generating a color framing signal which identifies a particular one of each of the plurality of sequentially repeating color fields of the PAL television signal, and means for synchronizing the means for dividing with the color framing signal, with said means for synchronizing employing the color framing signal, the reference signal and the offset-free reference signal.

The above, and other objects, features and advantages of the present invention, will become apparent from the following description read in conjunction with the accompanying drawings in which like reference numerals designate the same elements.

BRIEF DESCRIPTION OF THE DRAWINGS

FIG. 1 is a block diagram of a synchronizing signal generator according to an embodiment of the present invention;

FIGS. 2A–2H, 3A–3C and 4A–4K are respectively waveform diagrams to which reference will be made in explaining the operation of the embodiment of the invention shown in FIG. 1;

FIG. 5 is a waveform diagram showing a color framing pulse inserted into a color television signal; and FIG. 6 is a block diagram of a portion of a synchronizing signal generator according to a second embodiment of the invention.

DETAILED DESCRIPTION OF THE PREFERRED EMBODIMENTS

Before proceeding with a detailed description of the illustrated embodiments of the invention, the theoretical basis therefor will be described. In this connection, it will be seen that, if both sides of equation (2) are multiplied by 4/7, the following equation (3) is obtained:

$$4/7 f_{SC} = F_{SC} = 162 f_H + 1/7 f_H + 2/7 f_V \qquad (3)$$

Thus, it will be apparent that the frequency $F_{SC}$, which is obtained by multiplying the color sub-carrier frequency $f_{SC}$ by 4/7, has a 1/7 offset with respect to the horizontal synchronizing frequency $f_H$ and also a 2/7 offset with respect to the vertical synchronizing frequency $f_V$. The 1/7 offset is one cycle of a reference signal having a frequency of $4f_{SC}$ and the 2/7 offset is two cycles of the reference signal.

Since the signal with a frequency $F_{SC}$ can be produced by counting down or frequency dividing a reference signal having a frequency of $4f_{SC}$ by 7, if the signal which is supplied to a counter serving as the frequency divider for producing the signal with the frequency $F_{SC}$ from the reference signal, has one cycle removed from it each horizontal period and has two additional cycles removed from it every vertical period, a signal $S'_O$ having a frequency $F'_{SC}$ is produced from which the offset has been removed.

If a signal having a frequency equal to an even integral multiple of the horizontal synchronizing frequency (e.g. $2f_H$) is produced from the signal with the frequency $F'_{SC}$, the required horizontal and vertical synchronizing frequency signals can be produced by counting down or frequency division.

The periodic removal of 1 and 2 cycles from the reference signal introduces a small amount of jitter therein. Such jitter can be removed using a phase locked loop having suitable time constant and gain. The same phase locked loop may be employed to produce the frequency equal to an even integral multiple of the horizontal synchronizing frequency.

Since the frequency dividers used in a synchronizing signal generator come up in random states when the power is first turned ON, the phase relation among the signals $S_H$, $S_V$ and $S_{SC}$ is initially random. Accordingly, as will appear below, means are provided according to the present invention to establish a known phase relationship therebetween.

When color television signals from a plurality of sources such as, for example, television cameras and/or video tape recorders, are to be edited into a single signal, the phase of the color sub-carrier signal $f_{SC}$ in the single signal should preferably follow the normal unbroken phase sequence through the points where sources of signals are changed in order to avoid discontinuity in color synchronization. To accomplish such phase synchronization, a color framing signal is produced for identifying a particular one of each sequence of eight fields (four frames) making up a PAL television signal. The form of such a color framing signal is well known (for example, in U.S. Pat. No. 4,115,800 issued on Sept. 19, 1978, which has a common assignee with the present application). Such a color framing signal may be recorded on a magnetic track (CTL track) of a video tape recorder to provide a timed identification pulse during playback for indicating the phase of the color sub-carrier.

The relative phases of the color sub-carrier signal, the horizontal synchronizing signal and the vertical synchronizing signal repeat each eight field periods in the PAL system. In order for the color framing signal to identify a particular one of the eight fields of the PAL system, the color framing signal must occur no oftener than once per eight frames. The color framing signal must be at most $\frac{1}{8}$ the frequency of the vertical synchronizing signal. Unless synchronizing means are provided, the phase of the color sub-carrier signal $S_{SC}$, which is provided by counting down the reference signal frequency $4f_{SC}$ by $\frac{1}{4}$, would be random with respect to the phase of a signal frequency of $\frac{1}{8}f_V$, which is provided by a separate frequency dividing operation. Due to such phase randomness, a signal which is merely counted down to a frequency $\frac{1}{8}f_V$ is not useful as a color framing signal. However, in accordance with this invention, a color framing signal provided by frequency dividing the oscillation frequency $4f_{SC}$ down to $\frac{1}{8}f_V$ is used to reset or preset a counter which counts down or frequency divides the oscillation frequency $4f_{SC}$ to produce the color sub-carrier signal $S_{SC}$, so that the phases of the color framing signal and the color sub-carrier signals are established in a predetermined relationship which permits maintaining color synchronization during editing.

Referring now to FIG. 1, it will be seen that, in the synchronizing signal generator according to this invention, as there illustrated, a reference or pulse oscillator 1 produces a reference signal or pulse train $S_O$ having a frequency of $4f_{SC}$. Reference signal $S_O$ is supplied through a pulse subtracting circuit or offset removing circuit 2 to a 1/7 frequency divider 3 which produces a frequency-divided output signal $S'_O$ (having a frequency of $F'_{SC} \cong 4/7f_{SC}$). $F'_{SC}$ is not exactly equal to $4/7f_{SC}$ since offset removing circuit 2, by periodically blocking or removing cycles of reference signal $S_O$, modifies the frequency slightly as will be explained. Signal $S'_O$ is then frequency-divided by 81 in a 1/81 frequency divider 4 to produce an output signal $S_{2H}$ having a frequency of $2f_H$ which is further frequency-divided by 1/625 frequency divider 5 to produce a vertical synchronizing frequency signal $S_V$ and is also frequency-divided by a $\frac{1}{2}$ frequency divider 6 to produce a horizontal synchronizing frequency signal $S_H$ having a frequency of $f_H$. Horizontal synchronizing frequency signal $S_H$ corresponds to the signal $S'_O$ divided by 162.

The 1/7 offset per cycle of the horizontal synchronizing frequency $f_H$ corresponds to one cycle of the reference signal $S_O$ supplied to 1/7 frequency divider 3 per horizontal interval, and the 2/7 offset per cycle of the synchronizing frequency $f_V$ corresponds to two cycles of the reference signal $S_O$ per vertical interval. Therefore, one pulse of the reference signal $S_O$ supplied to 1/7 frequency divider 3 is blocked or removed every horizontal period and an additional two pulses are removed every vertical interval. Hence the offset-free frequency-divided output $S'_O$ with the frequency of $F'_{SC}(=162f_H)$ applied to frequency divider 3 contains no offset.

Offset removing circuit 2 includes an AND gate circuit 8 for removing selected pulses of the reference signal $S_O$ applied to an input terminal thereof. A first gate pulse generator 9 receives the vertical synchronizing frequency signal $S_V$ from 1/625 frequency divider 5 and produces a gate pulse $P_{GV}$ having a width equal to two cycles of reference signal $S_O$. A second gate pulse generator 10 receives the horizontal synchronizing frequency signal $S_H$ from ½ frequency divider 6 and produces a gate pulse $P_{GH}$ having a width of one cycle of reference signal $S_O$. Gate pulses $P_{GV}$ and $P_{GH}$ are supplied through a NOR gate circuit 11 to the other input terminal of AND gate circuit 8. When either of gate pulses $P_{GH}$ and $P_{GV}$ is "1" or high, AND gate circuit 8 is inhibited or closed to thus prevent the passage therethrough of a corresponding number of cycles of reference signal $S_O$. Gate pulses $P_{GH}$ and $P_{GV}$ are timed to follow their respective triggering signals by different amounts in order to not overlap. Gate pulse $P_{GH}$, for example, may be timed to occur immediately after receipt of horizontal synchronizing frequency signal $S_H$ at the second gate pulse generator 10 whereas the beginning of gate pulse $P_{GV}$ may be delayed to begin after the completion of gate pulse $P_{GH}$. Thus, AND gate circuit 8 may block or remove the first cycle of reference signal $S_O$ in response to the gate pulse $P_{GH}$ produced, for example, by the positive-going transition of horizontal synchronizing frequency signal $S_H$, and may block or remove the second and third cycles of reference signals in response to gate pulse $P_{GV}$ produced, for example, by the positive-going transition of the vertical synchronizing frequency signal $S_V$. There is, of course, no requirement that the removed pulses be contiguous, but instead, they may be separated from each other on a horizontal line or on separate lines.

The first horizontal synchronizing frequency signal $S_H$ in an odd field and the corresponding vertical synchronizing frequency signal $S_V$ occur at substantially the same time. At about this time, three cycles of reference signals $S_O$ should be blocked or removed by AND gate circuit 8.

Since the first horizontal frequency signal $S_H$ in an even field is spaced 0.5 H from the corresponding vertical synchronizing frequency signal, overlap of gate pulses $P_{GH}$ and $P_{GV}$ is not a problem. However, the relative timing of gate pulses $P_{GH}$ and $P_{GV}$ following their respective triggering signals $S_H$ and $S_V$ which are established to avoid overlap in the odd fields can be used in the even fields without modification.

Due to the earlier referred to unevenness resulting from the removed cycles of reference signal $S_O$, horizontal and vertical synchronizing frequency signals $S_H$ and $S_V$ contain a small amount of jitter, and cannot be directly used for producing horizontal and vertical sync signals. Instead, horizontal synchronizing frequency signal $S_H$ is fed to a phase locked loop 20 which eliminates the jitter and produces a smoothed horizontal frequency signal $S_h$ having no offset therein and a signal $S_{2h}$ having a frequency of $2f_h$.

A voltage controlled oscillator 21 has an oscillation frequency of $2nf_h$ (n=1 and $f_h$ is the desired horizontal synchronizing frequency). The output of voltage controlled oscillator 21 is supplied to a 1/n frequency divider 22 to be frequency-divided by n and hence to produce a signal $S_{2h}$ having a frequency of $2f_h$. The signal $S_{2h}$ is fed to a ½ frequency divider 23 where it is frequency-divided by 2 to produce the smoothed horizontal synchronizing signal $S_h$. Horizontal synchronizing signal $S_h$ is applied to an output terminal 23a. Smoothed signal $S_h$ and the horizontal synchronizing frequency signal $S_H$ containing jitter are applied to a phase comparator 24 which supplies a control voltage through a low pass filter 25 to voltage controlled oscillator 21. Using phase locked loop 20, the phase of the signal $S_h$ is made coincident with that of the signal $S_H$ and the jitter in signal $S_H$ is removed. In addition to its use in producing the horizontal synchronizing frequency signal, signal $S_{2h}$ from the 1/n frequency divider 22 is frequency-divided by 625 in 1/625 frequency divider 27 to produce a jitter-free vertical synchronizing frequency signal $S_v$ which is delivered to an output terminal 27a. Signals $S_h$ and $S_v$ are supplied to a synchronizing signal generator circuit (not shown) which produces well known horizontal and vertical synchronizing pulses. A suitable synchronizing signal generator circuit is described in detail in U.S. Pat. No. 4,162,508 which was issued on July 24, 1979 and assigned to the assignee of this application.

The signal $S_{2h}$ is also supplied to a burst flag pulse (BF) generating circuit 28 and a line alternate signal (ALT) generating circuit 29 (peculiar to the PAL system) which then apply signals BF and ALT to their output terminals 28a and 29a, respectively. Signals BF and ALT are phase synchronized with other signals from the apparatus by being reset (or set) by a color framing signal $P_F$ (which will be described later).

The color sub-carrier signal $S_{SC}$ is produced by a ¼ frequency divider 30 which divides reference signal $S_O$ from reference oscillator 1 by 4 and applies the color sub-carrier signal $S_{SC}$ to an output terminal 30a. The relative phase of the color sub-carrier signal $S_{SC}$ in a PAL system repeats every 8mV (m=1, 2, 3 ... and V is the field period). Thus, a color framing signal $P_F$ must have a period corresponding to at least 8 field periods. A color framing signal generating circuit 40, in which m is 1, produces color framing signal $P_F$ having such a period.

Vertical synchronizing frequency signal $S_V$ can be thought of as signals $S_{VO}$ and $S_{VE}$ (FIGS. 2B and 2C) which are delivered from the 1/625 frequency divider 5 (where O indicates the signal associated with the odd field and E indicates the signal associated with the even field). Signals $S_{VO}$ and $S_{VE}$ are applied to an input of an exclusive OR circuit 42. Delay time $D_1$ results from propagation delays in frequency dividers 3, 4 and 5. Signals $S'_{VO}$ and $S'_{VE}$ (FIGS. 2D and 2E), which are provided by additionally delaying the signals $S_{VO}$ and $S_{VE}$ by $D_2$ in a delay circuit 41, are supplied to the other input of exclusive OR circuit 42. Accordingly, exclusive OR circuit 42 produces a pulse output $P_V$ during the time that its two inputs are different (that is, during delay time $D_2$). Output $P_V$ includes an output $P'_{VO}$ (FIG. 2F) associated with the odd field and an output $P'_{VE}$ (FIG. 2G) associated with the even field. The output $P_V$ from exclusive OR circuit 42 and the horizontal synchronizing frequency signal $S_H$ from ½ frequency divider 6 are supplied to an AND gate circuit 43 to produce an output $P_O$ (FIG. 2H) only in response to the odd field signal $P'_{VO}$. This relates the phase of color framing signal $P_F$ to the phase of horizontal and vertical synchronizing frequency signals $S_H$ and $S_V$.

The output $P_O$ from AND gate circuit 43 (also shown in FIG. 3A), is supplied to a ¼ frequency divider 44 which produces a frequency divided color framing signal $P_F$ having a period equal to eight field periods (FIG. 3B). A positive-going edge of color framing signal $P_F$ (FIG. 3B) may be used to trigger a conventional pulse generator (not shown) to produce a pulse $P'_F$ (FIG. 3C) occurring once per eight field periods. Color framing signal $P_F$ or pulse $P'_F$ is obtained only in the first of eight fields, so that it corresponds to a particular one of the first to eight fields (namely the first field). Color framing signal $P_F$ (or $P'_F$) is applied to an output terminal 44a.

In order to match the color framing of two color television signals, the phase relation between the color framing signal $P_F$ or $P'_F$ and the color sub-carrier signal $S_{SC}$ of the two color television signals must be the same. However, when the power is first turned ON, ¼ counter or frequency divider 30 may begin at any one of four possible counts. For example, a color sub-carrier signal $S_{SC}$ shown in FIG. 4B has a positive-going transition at the positive-going edges of the first, fifth, ninth and thirteenth pulses of the pulse train $S_O$ shown in FIG. 4A. However, due to an initial count in ¼ counter 30 at turn-on, the positive-going transitions of color sub-carrier signal $S_{SC}$ may coincide with the positive-going edges of the second, sixth, tenth and fourteenth; the third, seventh, eleventh and fifteenth; and the fourth, eighth, twelfth and sixteenth of the pulse train $S_O$. Thus there are four possible phase relations between the color sub-carrier signal $S_{SC}$ and the color framing signal $P_F$. Unless a particular one of the four phase relations is established after the power is turned ON, the color framing signal cannot be used.

In order to perform the required phase synchronization between color framing signal $P_F$ (or $P'_F$) and color sub-carrier signal $S_{SC}$, a timing signal designating or synchronizing circuit 50 produces a load, reset or preset signal $S_{q4}$ which loads, resets or presets ¼ frequency divider 30 so that it contains a particular count (such as "0","0") at a time related to the phase of color framing signal $P_F(P'_F)$. Thereafter, color sub-carrier signal $S_{SC}$ and color framing signal $P_F$ ($P'_F$), being derived from the same reference signal $S_O$, should cycle in the relative phase established by the presetting or resetting of ¼ frequency divider 30.

The delay of the color framing signal $P_F$ from the triggering edge of reference signal $S_O$, due to the existence of the counters or frequency dividers and the like, may constitute a large fraction of a cycle or even more than one cycle of reference signal $S_O$. Furthermore, such delay may vary with the type of elements used in the circuit and may also vary due to external factors such as temperature and humidity. Load, preset or reset signal $S_{q4}$ desirably has a period equal to no more than one cycle of reference signal $S_O$. If the load signal $S_{q4}$ is wider than one cycle of the reference signal $S_O$, ¼ frequency divider 30 may not be loaded at the desired time.

The color framing signal $P_F$ with a period of eight field periods is essentially gated by a cycle of reference signal $S_O$ with the frequency of 4 $f_{SC}$ in timing signal designating circuit 50 to produce a load signal $S_{q4}$ occurring at a precisely predictable time end having a width equal to the effective portion of a cycle of reference signal $S_O$.

Timing control circuit 50 includes first and second timing control circuits 50A and 50B. First timing control circuit 50A includes two D-type flip-flop circuits 51 and 52 whose clear terminals C1 are supplied with the color framing signal $P_F$ from ¼ frequency divider 44 and whose clock terminals Ck are supplied with the offset-free reference signal $S'_O$ from 1/7 frequency divider 3.

At the beginning of the odd field when the positive going leading edges of the vertical and horizontal synchronizing frequency signals $S_V$ and $S_H$ coincide, signals $S_O$, $S_{SC}$, $S_P$ and $S'_O$ have the phase relation shown in FIGS. 4A to 4D. As described previously, at this time, a total of three clock pulses are removed from the clock pulse signal or reference signal $S_O$ by AND gate circuit 8. Although other proportioning is possible, 1/7 frequency divider 3 goes "1" or high for 4 cycles of signal $S_P$, then goes "0" or low for the remaining 3 cycles of its 7-cycle sequence. The 1/7 frequency divider or counter 3 starts counting at the arrival of the first pulse of the pulse train $S_P$, and produces the signal $S'_O$ shown in FIG. 4D. Note that cycles 2–4 of reference signal $S_O$ (FIG. 4A) are removed or blocked from signal $S_P$ (FIG. 4C). D-type flip-flop circuit 51 is enabled by the voltage B+ applied to its data terminals $D_1$. When the color framing signal $P_F$ is applied to D-type flip-flop circuit 51 delayed from the triggering edge of reference signal $S_O$ by $\tau_1$ (FIG. 4E), an inverted output signal $\overline{S_{q1}}$ is produced at the inverted output $\overline{Q_1}$ of D-type flip-flop circuit 51 in synchronism with the first positive going edge of the signal $S'_O$ immediately following the occurrence of color framing signal $P_F$ (FIGS. 4F and 4G). The inverted output signal $\overline{S_{q1}}$ is applied to a data terminal $D_2$ of D-type flip-flop circuit 52 which, in turn, produces an output signal $S_{q2}$ (FIG. 4H), at terminal $Q_2$. Signal $S_{q2}$ has a pulse width equal to one cycle of the signal $S'_O$ (FIG. 4D). Since output signal $S_{q2}$ is always produced in synchronism with the first cycle of signal $S'_O$ immediately following the color framing signal $P_F$, the color framing signal $P_F$ is essentially gated by the signal $S'_O$ and occurs at a precisely repeatable time.

The output signal $S_{q2}$ from D-type flip-flop circuit 52 is supplied to clear inputs C1 of D-type flip-flop circuits 53 and 54 in timing control circuit 50B. The reference signal $S_O$ is applied to the clock inputs of D-type flip-flop circuits 53 and 54. A DC voltage B+ is applied to a data terminal $D_3$ of D-type flip-flop circuit 53. An inverted output signal $\overline{S_{q3}}$ of D-type flip-flop circuit 53 (FIGS. 4I and 4J) is applied to a data terminal $D_4$ of D-type flip-flop circuit 54. At the beginning of the first cycle of reference signal $S_O$ following the appearance of signal $\overline{S_{q3}}$ (cycle 12 in FIG. 4A), a load, preset or reset signal $S_{q4}$ is applied to ¼ frequency divider. As seen in FIG. 4K, signal $S_{q4}$ is "1" or high for a single cycle of reference signal $S_O$. Thus signal $S_{q4}$ is essentially gated by the reference signal $S_O$. Since the rise and fall of signal $S_{q4}$ is controlled by reference signal $S_O$, signal $S_{q4}$ has a pulse width within one cycle or clock of the reference signal $S_O$.

Upon the arrival of signal $S_{q4}$, ¼ frequency divider 30 is loaded or preset. For example, the contents of the two stages of ¼ frequency divider 30 may be as shown just above FIG. 4A. At the end of cycle 8 of signal $S_P$ (FIG. 4C), corresponding to cycle 11 of reference signal $S_O$, signal $S_{q4}$ becomes "1" or high (FIG. 4K). This loads or presets the value "1","1" into ¼ frequency divider 30. The next cycle (cycle 12 in FIG. 4A) of reference signal $S_O$ triggers ¼ frequency divider 30 into the "0","0" condition. (As shown in FIG. 4A, the phase of ¼ frequency divider 30 begins correctly so that no change is made in the content thereof by load, preset or reset signal $S_{q4}$.) The ¼ frequency divider 30 thereafter continues to cycle in synchronism with color framing signal $P_F$ ($P'_F$) from this correct reference condition.

FIG. 5 shows a color framing signal $P'_F$ inserted into a color television signal every eighth field (8 V).

As described above, since the phase of ¼ frequency divider 30 is controlled by the color framing signal $P_F$, the phase of color sub-carrier signal $S_{SC}$ is synchronized with the horizontal synchronizing frequency signal $S_h$ and color framing signal $P_F$. In addition, since 1/625 frequency divider 27, burst flag generator 28 and alt signal generator 29 are reset by the color framing signal $P_F$, the proper relative phase of these signals is established. Therefore, if an editing device, such as a video tape recorder, receives the color framing signal $P_F$ together with a color video signal from an associated camera and the sub-carrier and other timing signals described hereinabove, color synchronization can be maintained through editing points.

Timing signal designating circuit 50 which loads, presets or resets ¼ frequency divider 30 establishes correct synchronization a short time after the power is turned ON, and is not normally needed thereafter. A switch (not shown) may be optionally provided to disconnect or turn OFF timing signal designating circuit 50 after synchronization has been completed.

Although reference signal $S_O$ from reference oscillator 1 has a frequency of 4 $f_{SC}$, this is not a necessary limitation. For example, reference signal $S'_O$ may have a frequency of $P \cdot f_{SC}$ (where P is an integer). In this case, other ratios in the frequency dividers are necessary but their selection would be within the ability of one skilled in the art.

The previously described embodiment of the circuit places strict accuracy requirements on first and second gate pulse generators 9 and 10. Gate pulse generator 10 must, for example, produce an accurately timed pulse of precise width to remove or block a single cycle of reference signal $S_O$. Similarly, gate pulse generator 9 must generate an accurately timed pulse having a width precisely equal to two cycles of reference signal $S_O$. Such precise pulse requirements result in an expensive circuit.

Referring now to FIG. 6, there is shown an embodiment of the present invention which does not require the precision in pulse width and timing which were necessary in pulse subtracting or offset removing circuit 2 of FIG. 1. In FIG. 6, an offset signal generator 102 has been substituted for pulse subtracting or offset removing circuit 2 of FIG. 1, a programmable divider or counter 103 has been substituted for 1/7 frequency divider 3 of FIG. 1 and a 1/81 frequency divider 104 which provides an external indication of the content or number therein has been substituted for 1/81 frequency divider 4. All other circuits of FIG. 6 are identical to those of FIG. 1 and thus, only the circuits necessary for explaining the difference in the embodiment of FIG. 6 are included therein.

The reference signal or pulse train $S_O$ from reference oscillator 1 is applied to an input of programmable divider or counter 103. Programmable divider 103 is selectably operative to divide its input signal by a factor of 7 or 8 depending on the condition of a control input applied thereto. When programmable divider 103 divides its input by 8, this is the equivalent of subtracting or blocking one cycle of reference signal $S_O$ compared to the situation when programmable divider 103 divides its input by 7.

Offset signal generator 102 contains a decoder 105 receiving a plurality of signals from 1/81 frequency divider 104. Decoder 105 produces an output signal during three specific input counts in each cycle of 1/81 frequency divider 104. For example, decoder 105 may produce an output signal when the contents of 1/81 frequency divider 104 equals 10, 20 and 30 or any other three numbers which can be contained within 1/81 frequency divider 104. Decoder 105 thus applies three pulses to offset controller 107, each exactly corresponding in length of one cycle of signal $F'_{SC}$ during the first half and during the second half of each horizontal interval. Such a cycle of signal $F'_{SC}$ may encompass 7 cycles of reference signal $S_O$ when programmable divider 103 is operative to divide by 7 and may encompass 8 cycles of reference signal $S_O$ when programmable divider 103 is operative to divide by 8. The horizontal frequency signal $S_H$ is applied to a pulse generator 106 which produces an enabling pulse signal $F_{HP}$ having a duration which is not critical. Signal $S_V$ is applied to a pulse generator 108 which produces an enabling pulse $F_{VP}$ having a duration which is also not critical.

Programmable divider or counter 103 normally operates to divide reference signal $S_O$ by 7 to produce signal $F'_{SC}$. At the beginning of a line, an output signal from 1/81 frequency divider 104 triggers ½ frequency divider 6 into producing a horizontal synchronizing signal which, in turn, triggers pulse generator 106 into producing a signal $F_{HP}$ which is applied to offset controller 107. When sufficient cycles of signal $F'_{SC}$ have been produced by programmable divider 103 to increase the count in 1/81 frequency divider 104 to a predetermined one of the three numbers which are decodable by decoder 105, decoder 105 produces an output signal which is applied through logic circuits (not shown) in offset controller 107 to programmable divider 103 to change the dividing ratio thereof to 8. This may occur, for example, when the content or number in 1/81 frequency divider 104 is 10. After eight additional cycles of reference signal $S_O$ are received in programmable divider 103, its output signal $F'_{SC}$ changes the content or number in 1/81 frequency divider 104 to, for example, 11. This change causes decoder 105 to remove the control signal applied through offset controller 107 to programmable divider 103 and to thereby return programmable divider 103 to a dividing ratio of 7. Thus, even though pulse $F_{HP}$ has relatively broad tolerances, the use of decoder 105 in conjunction with the output of pulse generator 106 to produce the control pulse for application to programmable divider 103 results in a precisely timed control pulse operative to permit programmable divider 103 to perform exactly one complete cycle at a dividing ratio of 8 and to then return to a dividing ratio of 7. The 1/81 frequency divider 104 completes two counting cycles during a horizontal interval. Although decoder 105 may again sense a content of 10 in 1/81 frequency divider 104 during the second half of a horizontal line, this does not result in a second control pulse to programmable divider 103 for lack of a gating signal $F_{HP}$ at the input of offset controller 107.

The vertical synchronizing signal $S_V$ applied to pulse generator 108, produces an output pulse $F_{VP}$ which is applied to an input of offset controller 107. Each time signal $F_{VP}$ occurs, the remaining two decoded signals from decoder 105 are applied when they occur through offset controller 107 to programmable divider 103. Each of these signals changes the dividing ratio of programmable divider 103 from 7 to 8 for a total of 8 input cycles of reference signal $S_O$ and then returns the dividing ratio to 7. For example, if decoder 105 is operative to decode numbers 20 and 30 in 1/81 frequency divider 104, when the content of 1/81 frequency divider 104 reaches 20, the decoded output is fed through offset controller 107 enabled by signal $F_{VP}$ to programmable divider 103 for one cycle thereof. Later, when the content of 1/81 frequency divider 104 reaches 30, decoder 105 produces another pulse, gated through offset controller 107 by signal $F_{VP}$ to programmable divider 103. Thus, following each vertical synchronizing signal $S_V$, a total of two cycles of reference signal $S_O$ are removed during the production of signal $F'_{SC}$. At the beginning of the first line of each odd field, both the horizontal and vertical synchronizing signals $S_H$ and $S_V$ are produced. During the first 0.5 H of the first line, decoder 105, offset controller 107 and programmable divider 103 remove three cycles of reference signal $S_O$. As is well known, the horizontal and vertical synchronizing pulses at the beginning of even fields are displaced by 0.5 H. Thus, when the first horizontal synchronizing pulse $S_H$ of an even field is produced, pulse generator 106 produces signal $F_{HP}$ for application to offset controller 107 but, during the first 0.5 H of this line while 1/81 frequency divider performs a complete cycle through its range, no vertical synchronizing signal $S_V$ is produced. Thus, when decoder 105 decodes, for example, 10, from 1/81 frequency divider 104, it applies a control pulse through offset controller 107 to programmable divider 103. However, during the first 0.5 H of this line, no corresponding gating pulse $F_{VP}$ is produced by pulse generator 108. Thus, when decoder 105 decodes contents 20 and 30 in 1/81 frequency divider 104, these decoded signals are not gated through offset controller 107. Thus, during the first 0.5 H of the first line of an even field, only one cycle of frequency signal $S_O$ is removed. In the second 0.5 H of the first line in an even field, the vertical synchronizing signal $S_V$ applied to pulse generator 108 produces a signal $F_{VP}$ for application to offset controller 107. As 1/81 frequency divider 104 cycles through its range during the second 0.5 H of this line, when decoder 105 decodes 10 in 1/81 frequency divider 104, offset controller 107 does not gate a control pulse to programmable divider 103 due to the absence of a signal $F_{HP}$ from pulse generator 106. However, when decoder 105 decodes counts of 20 and 30 in 1/81 frequency divider 104, control pulses are transmitted through offset controller 107 to programmable divider 103. Thus, in the first full line of an even field, three cycles of reference signal $S_O$ are removed as is required.

During horizontal lines other than the first in a field, the dividing ratio of programmable divider 103 is changed from 7 to 8 upon decoding a count of 10 in 1/81 frequency divider 104 during the first 0.5 H of the line and remains at a dividing ratio of 7 for the entire second 0.5 H due to the absence of either signal $F_{HP}$ from pulse generator 106 or signal $F_{VP}$ from pulse generator 108.

Having described specific preferred embodiments of the invention with reference to the accompanying drawings, it is to be understood that the invention is not limited to those precise embodiments, and that various changes and modifications may be effected therein by one skilled in the art without departing from the scope or spirit of the invention as defined in the appended claims.

What is claimed is:

1. A synchronizing signal generator for a PAL television signal processing system of the type employing a plurality of sequentially repeating color fields, a color subcarrier signal having a frequency of $f_{SC}$, a horizontal synchronizing signal having a frequency of $f_h$ and a vertical synchronizing signal having a frequency of $f_v$, comprising:

means for providing a reference signal having a frequency of $P \cdot f_{SC}$ (where P is an integer) satisfying the equation:

$$f_{SC} = (284 - \tfrac{1}{4} f_h) + \tfrac{1}{625} f_h$$

$$f_{SC} = \tfrac{1135}{4} f_h + \tfrac{1}{2} f_v$$

means for dividing said reference signal by P to provide said color subcarrier signal;
   means for periodically removing a predetermined number of cycles from said reference signal to produce an offset-free reference signal;
   means responsive to said offset-free reference signal for producing said vertical and horizontal synchronizing signals;
   means responsive to said offset-free reference signal for generating a color framing signal which identifies a particular one of each of said plurality of sequentially repeating color fields of said PAL television signal; and
   means for synchronizing said means for dividing with said color framing signal in response to said reference signal and said offset-free reference signal as well as said color framing signal.

2. A synchronizing signal generator according to claim 1; wherein said means for producing said vertical and horizontal synchronizing signals includes:
   a phase locked loop including a voltage controlled oscillator having a frequency of $2n \cdot f_h$ in which n is an integer;
   means in said phase locked loop for controlling said voltage controlled oscillator in dependence on said offset-free reference signal; and
   means for frequency dividing said frequency of $2n \cdot f_h$ for providing said horizontal and vertical synchronizing signals.

3. A synchronizing signal generator according to claim 1; wherein P is equal to 4.

4. A synchronizing signal generator according to claim 3; wherein said means for synchronizing includes a synchronizing circuit having first and second timing control circuits, said first timing control circuit being responsive to said offset-free reference signal and said color framing signal to produce a first timing signal, said second timing control circuit being responsive to said first timing signal and said reference signal to produce a second timing control signal, and said means for dividing being responsive to said second timing control signal for establishing a predetermined phase relationship of said color subcarrier signal with respect to said color framing signal.

5. A synchronizing signal generator according to claim 1; wherein said means for periodically removing includes gating pulse generating means responsive at least to said horizontal synchronizing signal for generating at least one gating pulse and offset removing means operative in response to said gating pulse to remove at least a predetermined portion of said reference signal.

6. A synchronizing signal generator according to claim 5; wherein said offset removing means includes a gate circuit in series with said means for providing a reference signal and said gate circuit is responsive to said at least one gating pulse to remove said predetermined portion of said reference signal.

7. A synchronizing signal generator according to claim 6; wherein said predetermined portion is one cycle of said reference signal.

8. A synchronizing signal generator according to claim 7; wherein said gating pulse generating means is further responsive to said vertical synchronizing signal for generating at least a second gating pulse and said gate circuit is responsive to said at least a second gating pulse to remove two cycles of said reference signal.

9. A synchronizing signal generator according to claim 5; wherein said means for removing includes a programmable counter operative to selectively divide said reference by a first or a second value in response to a control signal applied thereto, a controller operative to produce said control signal in response to said at least one gating pulse, and means for coinciding said control signal to one cycle of said programmable counter.

10. A synchronizing signal generator according to claim 9; wherein said means for coinciding includes a frequency divider for frequency dividing an output of said programmable counter, a decoder for decoding at least one condition of said frequency divider, and said controller is further operative in response to said decoder to produce said control signal.

11. A synchronizing signal generator according to claim 1; wherein P is equal to 4, said means for periodically removing includes a programmable counter selectively operable to divide said reference signal by 7 in the absence of a control signal or by 8 in the presence of said control signal, means responsive to each said horizontal synchronizing signal for generating said control signal for 8 cycles of said reference signal, and means responsive to said vertical synchronizing signal for generating said control signal for 16 cycles of said reference signal.

12. A synchronizing signal generator according to claim 11; wherein said 16 cycles comprise two additional groups of 8 cycles, and the first mentioned group of 8 cycles and each said additional groups of 8 cycles are spaced from each other by at least 7 cycles of said reference signal.

13. Apparatus for a PAL television signal processing system for producing a color subcarrier signal having a frequency of $f_{SC}$, an offset-free horizontal synchronizing signal having a frequency of $f_h$ and an offset-free vertical synchronizing signal having a frequency of $f_v$, comprising:

means for providing a reference signal having a frequency of $4 f_{SC}$ satisfying the equation:

$$f_{SC} = (284 - \tfrac{1}{4} f_h) + \tfrac{1}{625} f_h$$
$$f_{SC} = \tfrac{1135}{4} f_h + \tfrac{1}{2} f_v;$$

a programmable counter operative to selectively divide said reference signal by 7 in the absence of a control signal and by 8 in the presence of said control signal;

a 1/81 frequency divider operative to divide an output of said programmable counter by 81;

a ½ frequency divider operative, in response to an output of said 1/81 frequency divider, to produce said horizontal synchronizing signal;

a 1/625 frequency divider operative in response to said output of said 1/81 frequency divider to produce said vertical synchronizing signal;

a decoder operative to decode first, second and third conditions of said 1/81 frequency divider;

means responsive to each said horizontal synchronizing signal to produce a first gating signal;

means responsive to each said vertical synchronizing signal to produce a second gating signal;

controller means responsive to said first condition of said 1/81 frequency divider and said first gating signal to produce said control signal for 8 cycles of said reference signal;

said controller means being further responsive to said second condition of said 1/81 frequency divider and said second gating signal to produce said control signal for 8 cycles of said reference signal; and said controller means being further responsive to said third condition of said 1/81 frequency divider and said second gating signal to produce said control signal for an additional 8 cycles of said reference signal.

* * * * *